(12) United States Patent
Chien et al.

(10) Patent No.: US 7,582,825 B2
(45) Date of Patent: Sep. 1, 2009

(54) METHOD AND APPARATUS FOR KEYBOARD INSTRUMENT LEARNING

(75) Inventors: Shih-Ying Chien, Keelung (TW); Yio-Wha Shau, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 45 days.

(21) Appl. No.: 11/898,310

(22) Filed: Sep. 11, 2007

(65) Prior Publication Data
US 2009/0019990 A1 Jan. 22, 2009

(30) Foreign Application Priority Data
Jul. 16, 2007 (TW) ............... 96125787 A

(51) Int. Cl.
*G10H 3/06* (2006.01)
(52) U.S. Cl. ............... 84/724; 84/723; 84/744; 84/477 R
(58) Field of Classification Search ............... None
See application file for complete search history.

(56) References Cited

U.S. PATENT DOCUMENTS

| | | | |
|---|---|---|---|
| 3,501,834 A | 3/1970 | Lare | |
| 4,465,477 A | 8/1984 | AvGavaar | |
| 4,909,739 A | 3/1990 | Ladner et al. | |
| 5,314,337 A | 5/1994 | Dixon | |
| 5,533,903 A * | 7/1996 | Kennedy | 434/307 R |
| 5,557,055 A * | 9/1996 | Breitweiser, Jr. | 84/478 |
| 5,626,429 A | 5/1997 | Choate | |
| 6,018,117 A | 1/2000 | Harrison et al. | |
| 6,066,075 A | 5/2000 | Poulton | |
| 6,388,181 B2 * | 5/2002 | Moe | 84/477 R |
| 6,388,182 B1 * | 5/2002 | Bermudez | 84/477 R |
| 6,791,568 B2 | 9/2004 | Steinberg et al. | |
| 6,850,225 B1 | 2/2005 | Whitcroft et al. | |
| 6,982,375 B2 | 1/2006 | McGregor | |
| 2002/0050206 A1 * | 5/2002 | MacCutcheon | 84/477 R |
| 2003/0159564 A1 | 8/2003 | Oren-Chazon | |
| 2004/0125147 A1 | 7/2004 | Liu et al. | |
| 2004/0152057 A1 | 8/2004 | Chen | |
| 2004/0244570 A1 * | 12/2004 | Ando | 84/744 |
| 2005/0011339 A1 | 1/2005 | Kerkhoff | |
| 2005/0257665 A1 | 11/2005 | Kerkhoff | |
| 2007/0103430 A1 * | 5/2007 | Nishi | 345/156 |

OTHER PUBLICATIONS

Casio product "Ctk-710 61 Key Musical Keyboard" (which was downloaded on unknown date website of Casio company).

* cited by examiner

*Primary Examiner*—Marlon T Fletcher
(74) *Attorney, Agent, or Firm*—Birch, Stewart, Kolasch & Birch, LLP

(57) ABSTRACT

A method and apparatus for keyboard instrument learning are disclosed. The learning device comprises: a data access/storage device, for storing musical compositions and fingerings; an image signal output device for outputting image signals; a processing unit; and an imaging unit, capable of capturing an image of fingers fitted with marking units in respective and an image of surface where the fingers are placed. When the fingers fitted with the marking units are placed on an actual keyboard, the processing unit is enabled to compare the i,age captured by the imaging unit with a musical composition program so as to generate a control signal accordingly while using the control signal to issue an output signal. In another embodiment, when the fingers fitted with the marking units are placed on the surface without actual keyboard, the output unit issues an output signal with virtual keyboard for directing a user to press keys of the virtual keyboard indicated by the output signal while enabling the processing unit to identify whether the correct keys are passed and further are pressed by the correct fingers.

37 Claims, 7 Drawing Sheets

METHOD AND APPARATUS FOR KEYBOARD INSTRUMENT LEARNING

FIELD OF THE INVENTION

The present invention relates to a method and apparatus for keyboard instrument learning, and more particularly, to an interactive multimedia device capable of acting as a virtual musical keyboard to be used for fingering training in a self-educating and playful manner.

BACKGROUND OF THE INVENTION

For those music lovers who are willing to spend time learning a musical instrument either professionally or non-professionally, it is a hard just to familiarized oneself with those musical keyboards, which may require a great deal of time and money just trying to do so. Moreover, learning to play a musical keyboard well not only means that one can play each note precisely and accurately, but also requires that one can play the musical keyboard with correct fingering.

Please refer to FIG. 1, which shows a musical teaching device disclosed in U.S. Pat. No. 6,982,375, entitled "Musical Teaching Device and Method". As shown in FIG. 1, there are two gloves 17, 18 slidably attached to a carriage 11 mounted on a piano, while each of the two gloves 17, 18 is embedded with sensors that are electrically connected to a computer 50 by a cable 21. Thereby, the computer is able to determining whether the keys of the keyboard 12 are engaged according to a proper fingering. However, the structuring of the aforesaid device usually is specialized and complicated that it not only can not be adapted for conventional piano, but also do not provide virtual keyboard capability. In addition, as the user's hands are restricted to be placed on top of the keyboard 12 by the two gloves 17, 18, the user can not play with his/her normal position and gesture ergonomically so that the use of such device can be very uncomfortable.

Please refer to FIG. 2 and FIG. 2A, which show a musical keyboard disclosed in U.S. Pat. No. 5,557,055, entitled "Musical Keyboard Having an Electrically Controlled Display and a Method of Keyboard Display". The electronic musical keyboard 20 is composed of a plurality of black keys 25 and white keys 26, each of which are embedded with a numerical display 27 for informing a student player of the proper finger to be used on the keyboard 20. It is noted that the numerical displays 27 can be formed form conventional LED device that, when energized, display digits from one to five which represents respective the thumb, the index finger, the middle finger, the ring finger and the little finger of a student player. Moreover, the keyboard 20 further includes a hand-identifying display composed of a set of red-green illuminators 28 each having a red 28a and a green light 28b. It is contemplated that keys 25 and 26 normally appear as conventional black and white keys. However, the upper surfaces of keys 25 and 26 are made partially transparent such that its apparent color to a player will change when properly back lit by the red-green illuminators 28 and thus the red-green illuminators 28 can be selectively energized to inform the player which hand should be used to strike the illuminated key. In the exemplary embodiment shown in FIG. 2, the keys back-lighted by red lights 28a are shadowed by vertical cross hatchings that are to be struck by the right hand, and the keys back-lighted by green lights 28b are shadowed by diagonal cross hatchings that are to be struck by the left hand. For example, FIG. 1 shows normally white keys 26a and 26b illuminated to appear green while their numeric displays 27 show the digits "5" and "2," respectively. FIG. 1 also shows normally white keys 26c and 26d, and normally black key 25a illuminated to appear red while having their displays 27 show the digits "1," "3" and "2," respectively, by which the state of the keyboard 20 instructs the student to strike keys 26a and 26b with the little finger and index finger of the left hand, respectively, while striking keys 26c, 25a and 26d with the thumb, index finger and middle finger of the right hand, respectively. However, any student player must be able to recognize and identify the meanings of those color illuminations and numerical numbers displaying upon the keyboard 20 fast enough so as to play a note well, that may not be a easy task for elders or slow-learners and thus the interest of learning may extinguish. Further, the musical keyboard 20 itself will not be able to recognize whether the student player is playing by the instructions given from the electronic musical keyboard 20 or not. In addition, the structuring of the electronic musical keyboard 20 is specialized and complicated that it not only can not be adapted for conventional piano, but also do not provide virtual keyboard capability.

SUMMARY OF THE INVENTION

The object of the present invention is to provide a method and apparatus for keyboard instrument learning, being an interactive multimedia device capable of acting as a virtual musical keyboard to be used for fingering training in a self-educating and playful manner.

To achieve the above object, the present invention provides a keyboard instrument learning apparatus, which comprises: a data access/storage device, for storing musical compositions and fingerings; and an image signal output device, capable of accessing one musical composition and fingering selected from those musical compositions and fingerings stored in the data access/storage device and thus outputting an image signal accordingly.

In an exemplary embodiment of the invention, the keyboard instrument learning apparatus further comprises: a plurality of marking units, adapted to be fitted on user's fingers; an imaging unit, capable of capturing an image of fingers as the fingers are fitted with the marking units in respective and an image of a surface where the fingers are placed as well; and a processing unit, for analyzing the images captured by the imaging unit.

In another exemplary embodiment of the invention, the processing unit is capable of analyzing images including: the images of the marking units fitted on the user's fingers being captured by the imaging unit, and images of the image signal outputted from the image signal output device.

In another exemplary embodiment of the invention, when the fingers fitted with the marking units are placed on an actual keyboard, the processing unit is enabled to recognize and identify fingering positions of any one musical composition stored in the data access/storage device with relative to the actual keyboard.

In another exemplary embodiment of the invention, when the fingers fitted with the marking units are placed on a surface without actual keyboard, the processing unit is enabled to generate an image signal of virtual keyboard while marking fingering positions of any one musical composition stored in the data access/storage device with relative to the image of the virtual keyboard image.

In another exemplary embodiment of the invention, the imaging unit is a device selected from the group consisting of cameras, camcorders, and the like.

In another exemplary embodiment of the invention, the data access/storage device is enabled to input/output musical compositions from/to an external apparatus by connecting the same with the external apparatus in a manner selected from the group consisting of a wired manner and a wireless manner.

In another exemplary embodiment of the invention, the external apparatus is a device selected from the group consisting of a network, a computer, a storage device such as cassettes.

In another exemplary embodiment of the invention, the keyboard instrument learning apparatus further comprises: an audio signal output device, which can be a speaker, a loudspeaker, an earphone or the combination thereof.

In another exemplary embodiment of the invention, the image signal output device is a projector.

In another exemplary embodiment of the invention, the plural marking units are structured to be fitted on fingers while overall being designed with at least two distinctive appearances.

In another exemplary embodiment of the invention, the marking units are finger-cots capable of being mounted on the user's fingers.

In another exemplary embodiment of the invention, the marking units are adhesive parts capable of being adhered upon the user's fingers.

In another exemplary embodiment of the invention, the marking units are designed with different appearances, each composed of characteristics formed by at least a factor selected from the group consisting of colors, tones, geometrical patterns, geometrical lines and the combinations thereof.

In another exemplary embodiment of the invention, the colors and tones used for featuring each marking unit are achieved by a means selected from the group consisting of: coating the featuring colors and tones on the surfaces of the marking unit, attaching a patch of such colors and tones upon the marking unit, forming the marking unit with a material of such colors and tones, and integrally forming a part with such colors and tones with the marking unit.

In another exemplary embodiment of the invention, the marking units are configured with illuminators capable of emitting lights of different colors, and each illuminator is a device selected from the group consisting of light emitting diode (LED), light bulb and the like.

In another exemplary embodiment of the invention, the processing unit further comprises: a plurality of pressure sensors, being mounted on the user's fingers at positions where are used for pressing so that they are activated while pressed.

In another exemplary embodiment of the invention, the plural pressure sensors are arranged at pulp areas of the user's fingers in respective.

In another exemplary embodiment of the invention, the plural pressure sensors are electrically connected to a plurality of illuminators corresponding thereto in a manner that the illuminators are driven to emit light as soon as the corresponding pressure sensors are activated.

In another exemplary embodiment of the invention, the plural illuminators are arranged at dorsal areas of the user's fingers in respective.

In another exemplary embodiment of the invention, the brightness of the illuminator being lighted is in direct proportion with the pressure exerted on the corresponding pressure sensor.

In another exemplary embodiment of the invention, the audio volume of the audio signal output device is in direct proportion with the pressure exerted on the corresponding pressure sensor.

To achieve the above object, the present invention provides a keyboard instrument learning method, which comprises the steps of: storing musical compositions and fingerings in a data access/storage device; and using an image signal output device to access one musical composition and fingering selected from those musical compositions and fingerings stored in the data access/storage device and thus outputting image signal accordingly.

In an exemplary embodiment of the invention, the keyboard instrument learning method further includes a fingering comparison process, which comprises the steps of: fitting marking units onto fingers of a user in respective; using an imaging unit to capture an image of the fingers as the fingers are fitted with the marking units and an image of a surface where the fingers are placed; and using a processing unit to analyze the images captured by the imaging unit.

In another exemplary embodiment of the invention, the analysis of the processing unit is performed by comparing the images of the marking units fitted on the user's fingers being captured by the imaging unit with image of the image signal outputted from the image signal output device.

In another exemplary embodiment of the invention, the keyboard instrument learning method further comprises the steps of: determining whether an actual keyboard is existed in the images captured by the imaging unit; enabling the processing unit to recognize and identify fingering positions of the selected musical composition with relative to the actual keyboard if the actual keyboard exists; and enabling the image output device to generate a virtual keyboard while enabling the processing unit to mark fingering positions of the selected musical composition stored in the data access/storage device with relative to the virtual keyboard if no actual keyboard exists.

In another exemplary embodiment of the invention, as the images being compared in the fingering comparison process includes: the images of the marking units fitted on the user's fingers being captured by the imaging unit, and image of the image signal outputted from the image signal output device, the keyboard instrument learning method further comprises the steps of: enabling the image signal output device to access another musical composition and fingering and thus output another image signal accordingly if no abnormal is detected in the fingering comparison process; and issuing a alarming signal if abnormalities are detected in the fingering comparison process.

In another exemplary embodiment of the invention, the alarming signal is a signal selected from the group consisting of audio signals including muting, voice alert, etc., and video signals including warning images, flashing lights, etc.

Further scope of applicability of the present application will become more apparent from the detailed description given hereinafter. However, it should be understood that the detailed description and specific examples, while indicating several embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
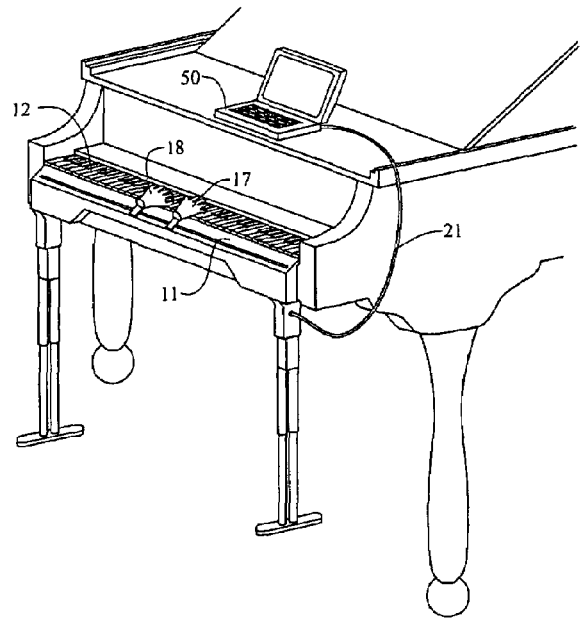
FIG. 1 shows a musical teaching device disclosed in U.S. Pat. No. 6,982,375.
Figure 2:
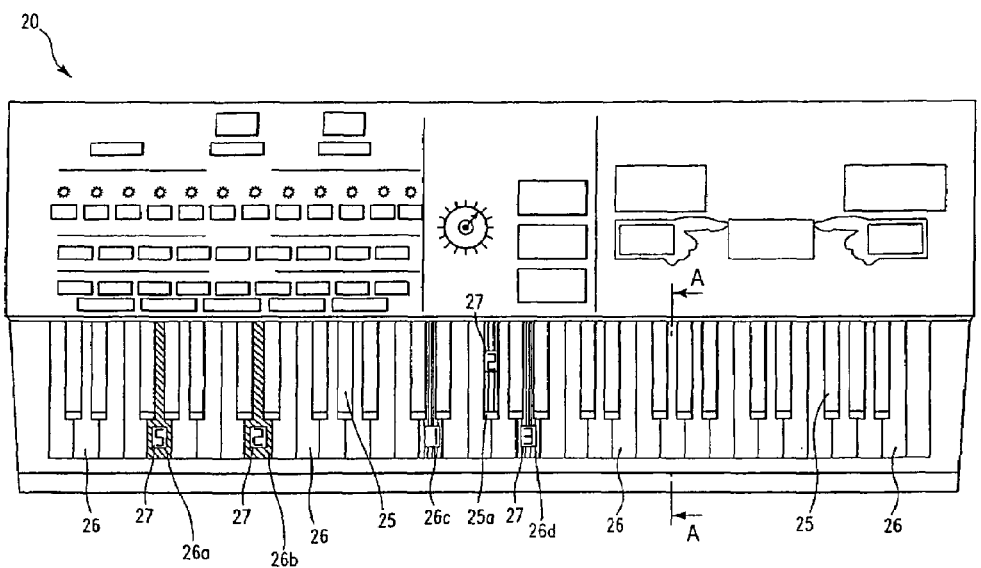
FIG. 2 shows a musical keyboard disclosed in U.S. Pat. No. 5,557,055
Figure 2A:
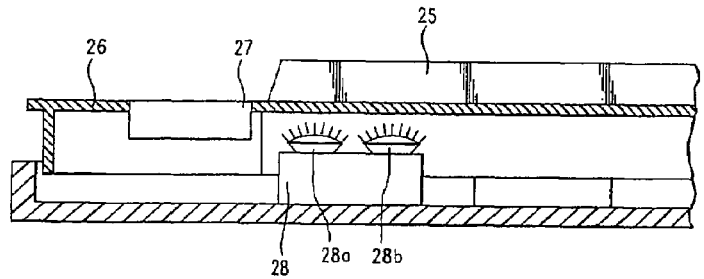
FIG. 2A is an A-A cross sectional view of FIG. 2.
Figure 3:
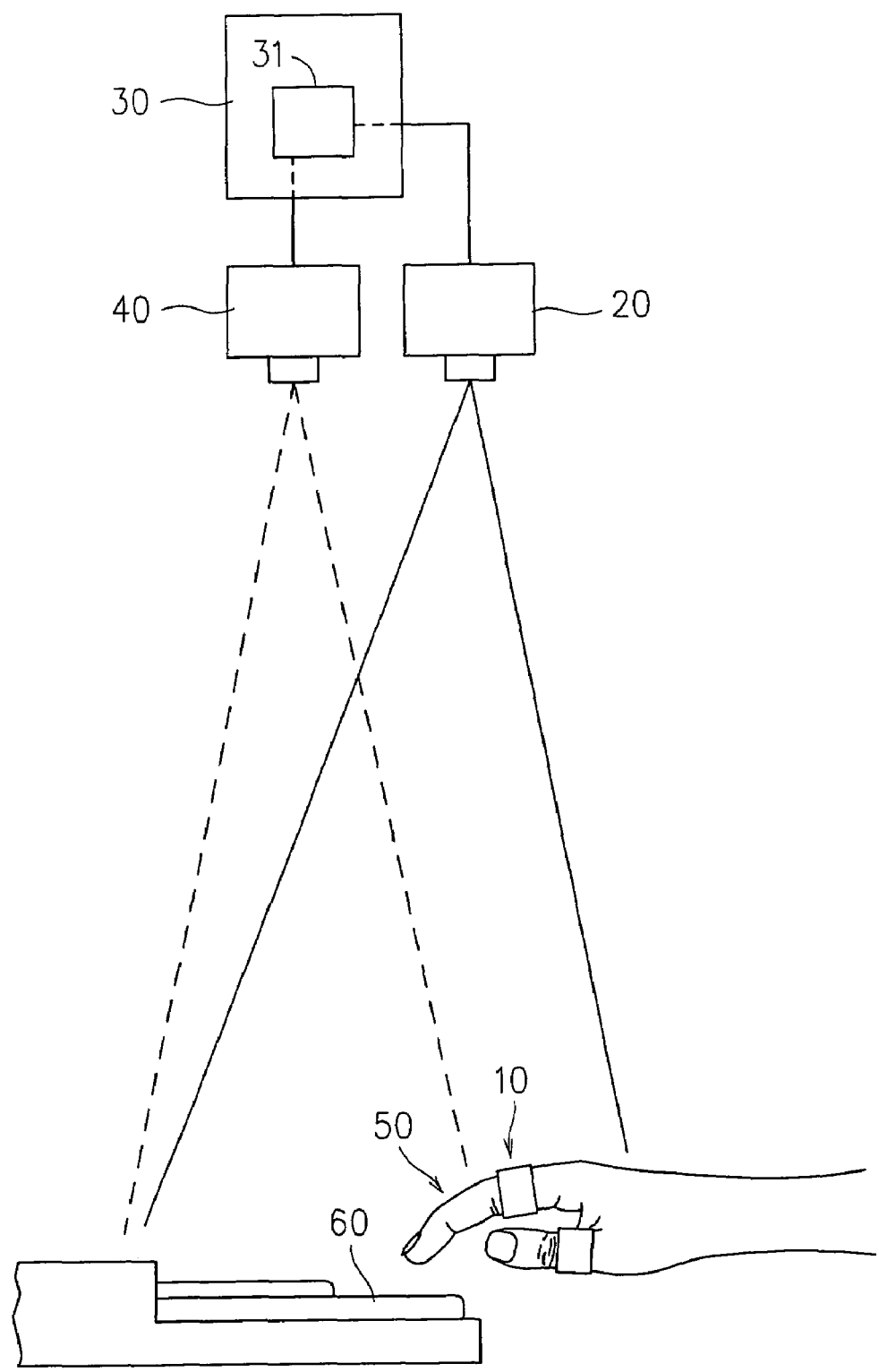
FIG. 3 is a schematic diagram illustrating a keyboard instrument learning apparatus according to an exemplary embodiment of the invention.

Please refer to FIG. 3, which is a schematic diagram illustrating a keyboard instrument learning apparatus according to an exemplary embodiment of the invention. In FIG. 3, the keyboard instrument learning apparatus comprises: a data access/storage device 30, for storing musical compositions and fingerings; and an image signal output device 40, being electrically connected with the data access/storage device 30 to access one musical composition and fingering selected from those musical compositions and fingerings stored in the data access/storage device 30 and thus outputting an image signal for instructing a user to play a musical keyboard 60 accordingly.

As shown in FIG. 3, there are marking units 10 being mounted on the user's fingers 50, and the data access/storage device 30 is electrically connected to an imaging unit 30, which can be a camcorder or a camera whichever is capable of capturing an image of the fingers 50 fitted with the marking units 10 in respective and an image of a surface where the fingers 50 are placed as well. In FIG. 3, the surface where the fingers 50 are placed is the musical keyboard 60, however, it can be any flat surface such as a desk-top. Moreover, the data access/storage device 30 is further configured with a processing unit 31, which is used for analyzing the images captured by the imaging unit 20, that is, for comparing the images of the marking units 10 fitted on the user's fingers 60 being captured by the imaging unit 20 with image of the image signal outputted from the image signal output device 40. It is noted that the musical compositions stored in the data access/storage device 30 is coded by a software so that they can be written directly into the data access/storage device 30. In an exemplary embodiment of the invention, the data access/storage device 30 can be composed of at least a memory unit, such as memory chips, for storing those musical compositions. In addition, the data access/storage device 30 is enabled to input/output musical compositions from/to an external apparatus by connecting the same with the external apparatus in a wired manner or a wireless manner, so that the musical compositions stored in the data access/storage device 30 can be updated as the external apparatus can be a network, a computer, a storage device such as cassettes.

The image signal outputted from the image signal output device 40 is composed of video signals and audio signals, in which the video signal can be displayed by a display device configured in the image signal output device 40, such as projector, TV or computer monitor, and the audio signal can be broadcasted by an audio device also configured in the image signal output device 40, such as speakers, loudspeaker, or earphones. In this exemplary embodiment shown in FIG. 3, the image signal output device 40 is substantially a projector. It is emphasized that the imaging unit 20, the image signal output device 40 and the data access/storage device 30 can all be disposed with reference to actual usage condition and space, that they are not limited to be positioned above the user's fingers 50 and the musical keyboard 60 as shown in FIG. 3. In addition, the positions of the user's fingers 50 where the marking units 10 are located can be varied at will with respect to the positioning of the imaging unit 20, the processing unit 30 and the image signal output device 40. Moreover, the communication between the imaging unit 20 and the data access/storage device 30 as well as that between the data access/storage device 30 and the image signal output device 40 can be achieved by a wired or a wireless manner.

Please refer to FIG; 4, which is a top view showing that fingers fitted with marking units are placed on an actual keyboard according to an exemplary embodiment of the invention. Normally, a common piano or electronic organ should be played with both hands using ten fingers. Thus, there should be ten marking units 10a~10j to be fitted upon the ten fingers 50a~50j of a user. There can be various methods for fitting the marking units 10a~10j onto the fingers 50a~50j. In this embodiment, the marking units 10a~10j are ring-like finger-cots that are coated with different colors. As the image signal output device 40 of FIG. 3 is a projector, it is designed to project colored patterns 41a~41j on keys of the musical keyboard 60 in a manner that the key selected to be pressed by one finger of the ten fingers 50a~50j should be projected with one colored pattern selected form the ten colored patterns 41a~41j whose color is the same that coated on the marking unit fitted on the selected finger.

Figure 4:
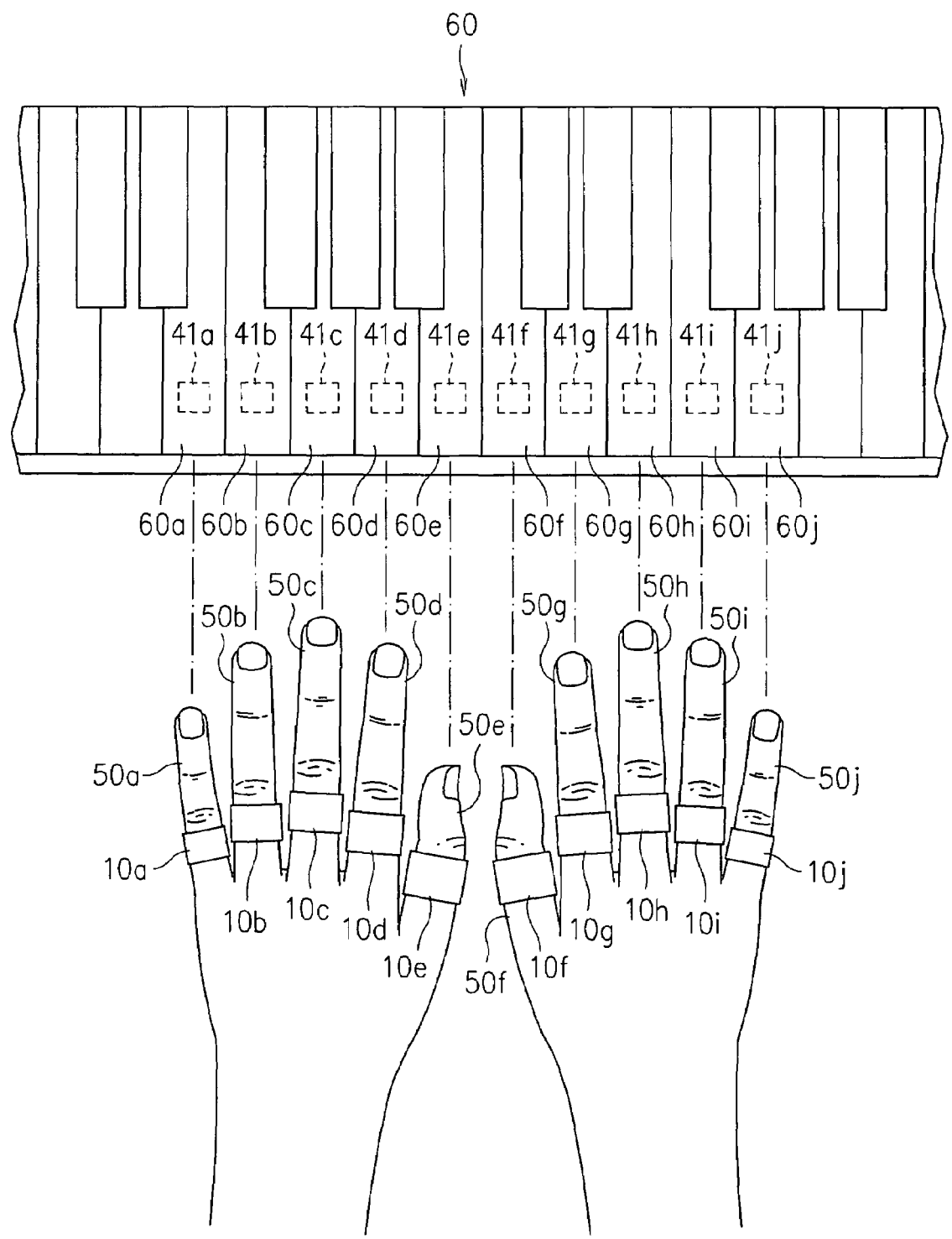
FIG. 4 is a top view showing that fingers fitted with marking units are placed on an actual keyboard according to an exemplary embodiment of the invention.
Figure 5:
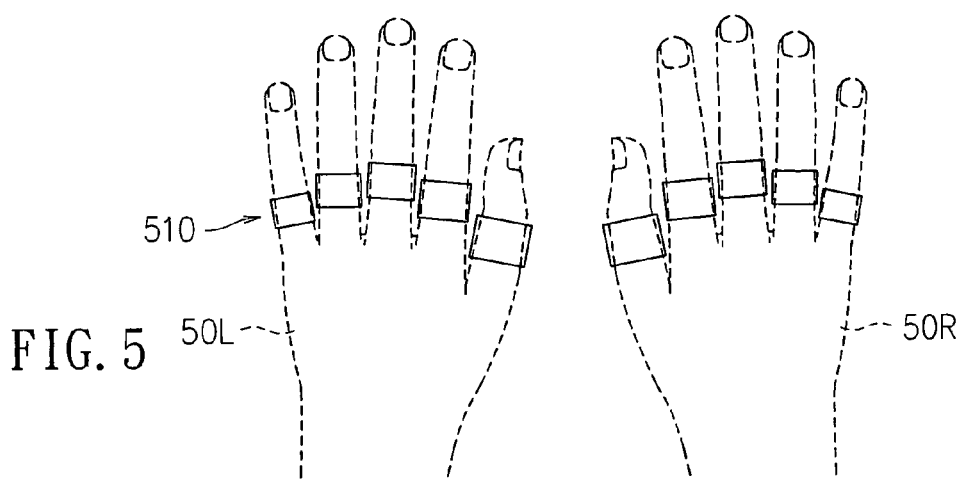
FIG. 5 to FIG. 7 illustrate a variety of marking units capable of being used in different embodiments of the invention.
Figure 6:
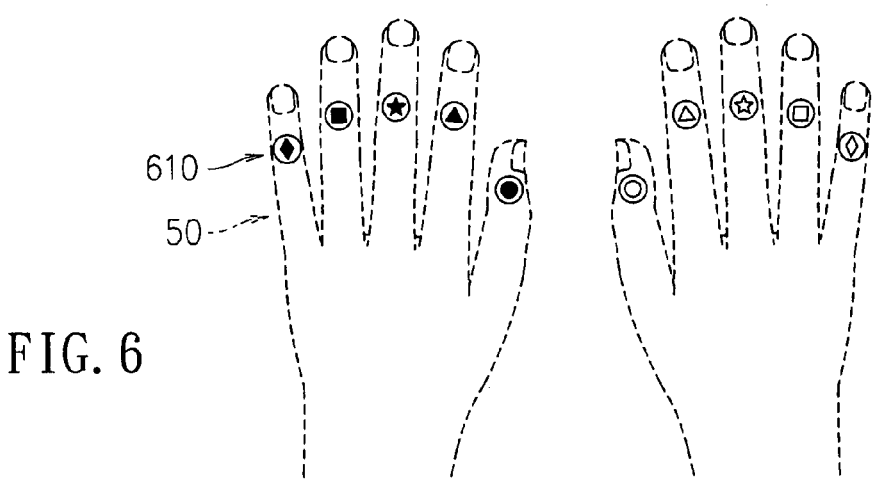
Figure 7:
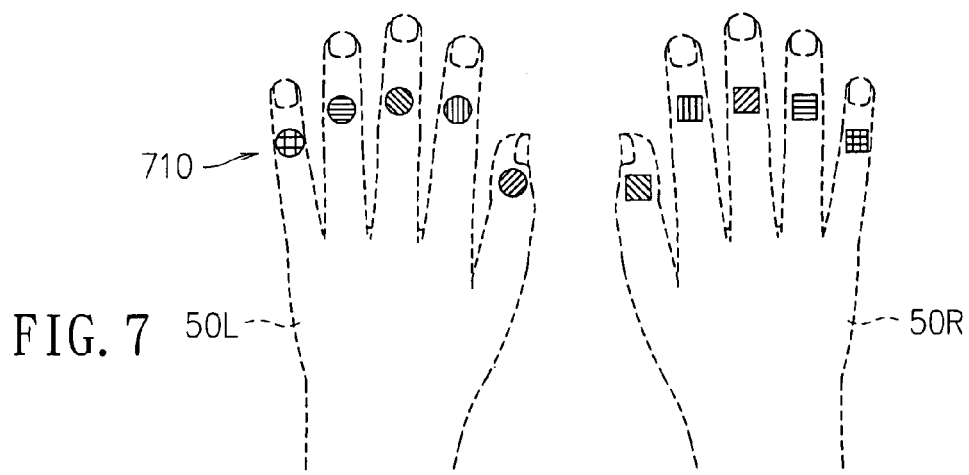

It is noted that the marking units are not limited to be the ring-like finger-cots shown in the embodiment of FIG. 4, that there can be a variety of designs. In FIG. 5, the ten marking units 510, also being ring-like finger-cots, are distinguishable from one another as they are respectively imprinted with characters L1~L5 and R1~R5 whereas those being imprinted with "L" are fitted upon the left-hand 50L while those being imprinted with "L" are fitted upon the right-hand 50R, and thereby, the ten fingers fitted with the ten marking units 510 are distinguishable from one another. In FIG. 6, the ten marking units 610 are round-shaped adhesive elements having different patterns printed thereon, by which the ten fingers fitted with the ten marking units 610 are distinguishable from one another. Moreover, in FIG. 7, the ten marking units 710 are also adhesive elements having different patterns printed thereon, which is similar to those shown in FIG. 6. The difference between the two is that: the patterns being printed on the thumbs of the right and the left hands are the same, which is also true for the index, the middle, the ring and the little fingers, however, only the marking units 710 used to be fitted on fingers of the left hand 50L are round shaped, those to be fitted on fingers of the right hand 50R are square shaped.

From the aforesaid embodiments, it is known that only if the marking units can provide distinctive identifications for distinguishing fingers of a user from one to another, there will be no limit for their structures and outlooks. It can be designed as a ring to be mounted on a finger or can be an adhesive element to be adhered on a finger. If the marking unit is designed to be an adhesive element, it may have long-lasting adhesive that can be used repetitively. In addition, as the marking units are designed with different appearances, each can be composed of characteristics formed by at least a factor selected from the group consisting of colors, tones, geometrical patterns, geometrical lines and the combinations thereof Moreover, the colors and tones used for featuring each marking unit are achieved by a means selected from the group consisting of: coating the featuring colors and tones on the surfaces of the marking unit, attaching a patch of such colors and tones upon the marking unit, forming the marking unit with a material of such colors and tones, and integrally forming a part with such colors and tones with the marking unit. In an exemplary embodiment, the marking units are configured with illuminators capable of emitting lights of different colors, by which different marking units can appear to have different colors and tones.

Figure 8:
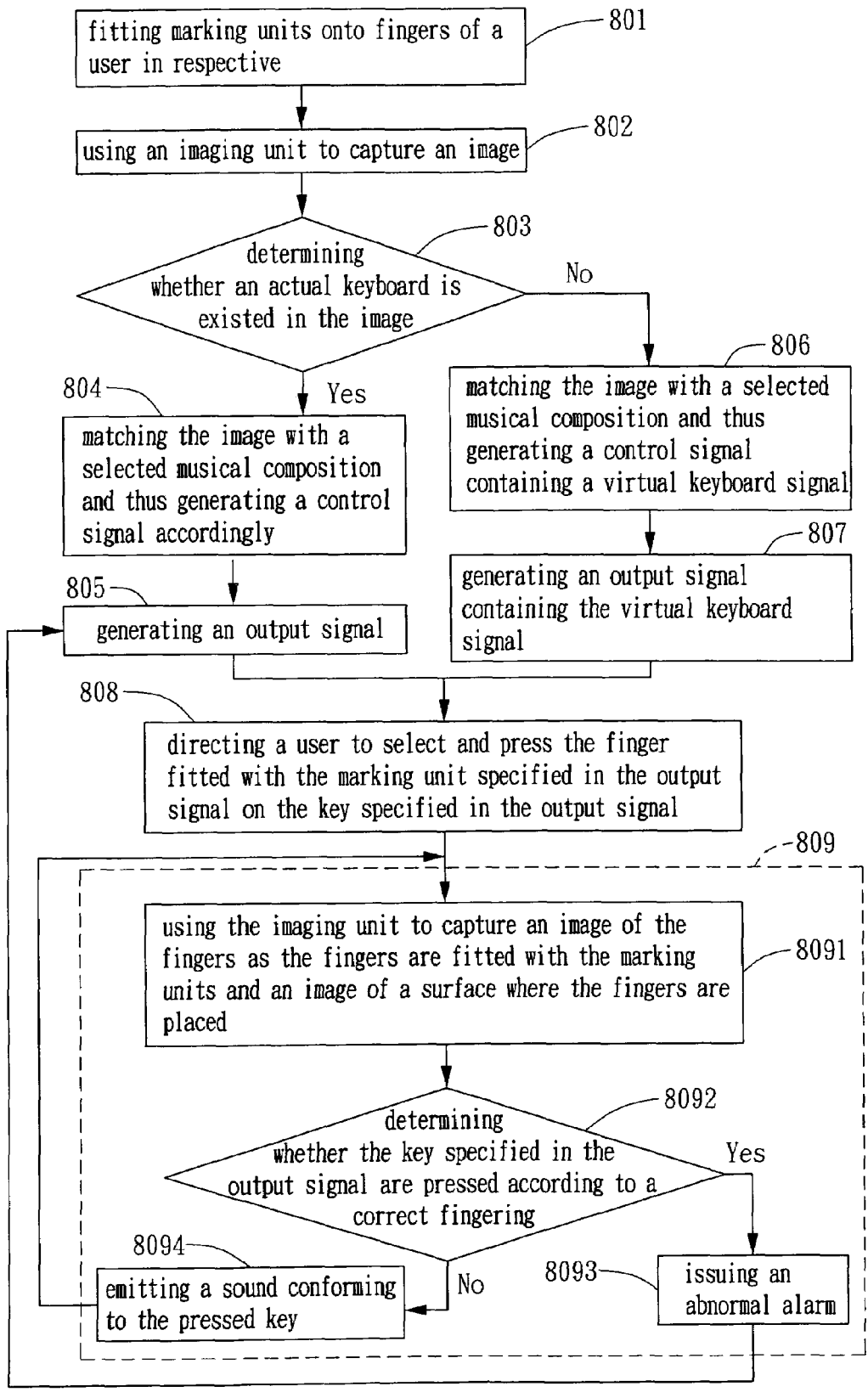
FIG. 8 is a flow chart depicting steps of a keyboard instrument learning method according to an exemplary embodiment of the invention.

Please refer to FIG. 8, which is a flow chart depicting steps of a keyboard instrument learning method according to an exemplary embodiment of the invention. As shown in FIG. 8, the keyboard instrument learning method comprises the steps of:

Step 801: fitting marking units onto fingers of a user in respective;

Step 802: using an imaging unit to capture an image of the fingers as the fingers are fitted with the marking units and an image of a surface where the fingers are placed;

Step 803: using a processing unit to determine whether an actual keyboard is existed in the images captured by the imaging unit;

Step 804: enabling the processing unit to recognize and identify fingering positions of the selected musical composition with relative to the actual keyboard while generating a control signal accordingly if the actual keyboard exists;

Step 805: transmitting the control signal to an output unit for enabling the output unit to generate an output signal accordingly; Step 806: enabling the processing unit to generate a virtual keyboard while enabling the processing unit to mark fingering positions of the selected musical composition with relative to the virtual keyboard if no actual keyboard exists;

Step 807: transmitting the control signal to an output unit for enabling the output unit to generate an output signal containing the virtual keyboard signal accordingly;

Step 808: directing a user to select and press the finger fitted with the marking unit specified in the output signal on the key specified in the output signal and thus obtaining an activation signal accordingly; that is, when the projector of FIG. 3 is used as the image signal output device and the marking units 10a~10j of FIG. 4 are fitted on fingers of a user, color patterns 40a~40j can be projected onto the keys 60a~60j with respect to the fingering of a selected musical composition, and thus, the user is directed to press the keys with the fingers fitted with marking units of colors matching to the color patterns of the keys; similarly, if no actual keyboard exists, the projector will project a virtual keyboard along with keys printed with color pattern according to the selected musical composition; and Step 809: checking whether the fingering of the user is correct or not as it is still possible for error fingering despite of the keys are marked by color patterns according to correct fingering; and the checking comprising the steps of:

Step 8091: using the imaging unit to capture an image of the fingers as the fingers are fitted with the marking units and an image of a surface where the fingers are placed Step 8092: using the processing unit to compare and determine whether the images of the marking units fitted on the user's fingers being captured by the imaging unit is conform to the image of the image signal outputted from the image signal output device;

Step 8093: emitting a sound conforming to the pressed key if no error is detected; and the flow proceeds back to step 805 or step 807; it is noted that as the invention is related to a keyboard instrument learning apparatus, the output signal can be a signal note or can be a sequence of notes as users can learn to play a musical composition in a note by note manner or can learn in a sequence by sequence manner, and thus, the processing unit can be programmed to perform the fingering comparison accordingly; and Step 8094: issuing an abnormal alarm if an error is detected; it is noted that the alarm can be issue by muting an audio device, i.e. silence while erroneous fingering is detected, or by voice alert, etc., as well as video signals including warning images, flashing lights, etc.

By the aforesaid method, a student player can learn to play a keyboard instrument with correct fingering. Moreover, as there can be plenty of musical compositions stored in the keyboard instrument learning apparatus, the student player is able to select a proper musical composition matching to his/her current age and learning ability for practice. Moreover, once the student player is familiar with the selected musical composition as well as its fingering, he/she can choose not to wear the marking units and play the keyboard 60 directly according to the directions specified in the image signal issued from the image signal output device 40, without fingering correctness checking and comparison.

Figure 9:
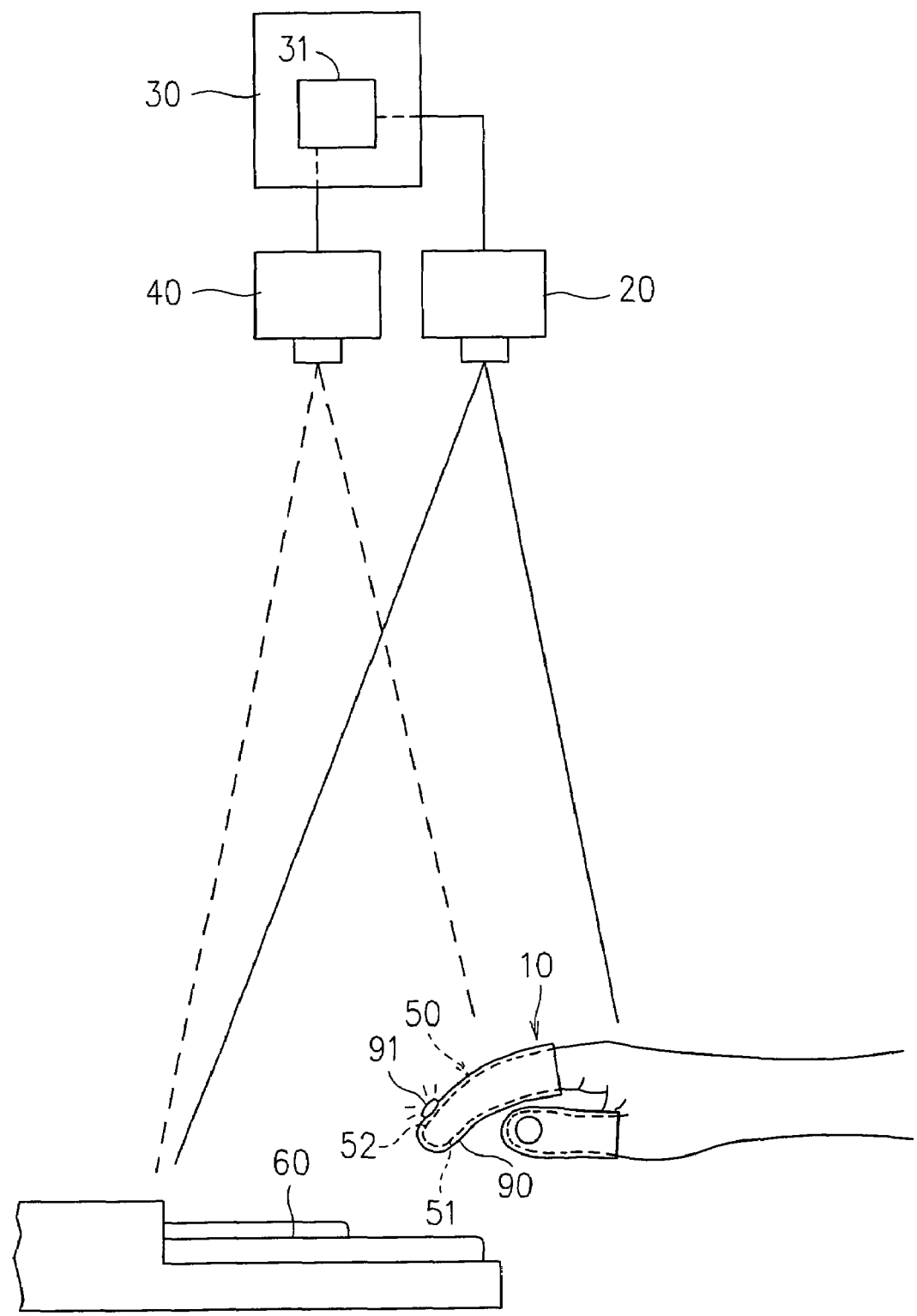
FIG. 9 is a schematic diagram illustrating a keyboard instrument learning apparatus according to another exemplary embodiment of the invention.

In piano playing, there can be fortes and crescendos in one musical composition. Thus, the keyboard instrument learning apparatus is configured not only for fingering correction checking, but also for pressing strength detection. Please refer to FIG. 9, which is a schematic diagram illustrating a keyboard instrument learning apparatus according to another exemplary embodiment of the invention. In FIG. 9, each marking unit 10 is formed as a finger sleeve capable of being mounted on user's fingers 50, in which a pressure sensor 90 is disposed at a position of the sleeve where are used for pressing, i.e. at the position of the finger sleeve 10 corresponding to the pulp area 51 of the finger 50; and a illuminator 90, such as LEDs or light bulbs, is disposed at the dorsal area 52 of the finger 50. Each pressure sensor 90 is electrically connected to the processing unit 30 and is also electrically connected to its corresponding illuminator 91. Thereby, when the user presses the keyboard 60, the pressure sensors 90 can be activated and thus driving the illuminator 91 to emit light. In addition, as the processing unit 30 is able to detect and analyze the pressures exerted upon the pressure sensors 90, it is able to control the illuminators 91 to emit light of different brightness accordingly or control a audio device to issue a sound of different volumes, i.e. not only the brightness of the illuminator 91 can be in direct proportion with the pressure exerted on the corresponding pressure sensor 90, but also the audio volume of the audio signal output device can be in direct proportion with the pressure exerted on the corresponding pressure sensor 90. The aforesaid is especially important while applying the keyboard instrument learning apparatus of invention in virtual keyboard applications, since it can enhance the realistic of the virtual keyboard. Moreover, the processing unit 30 can be connected with Internet so that, with video conferencing, more than one players can compete on the same platform and thus the playfulness of the keyboard instrument learning apparatus can be enhanced.

Figure 10:
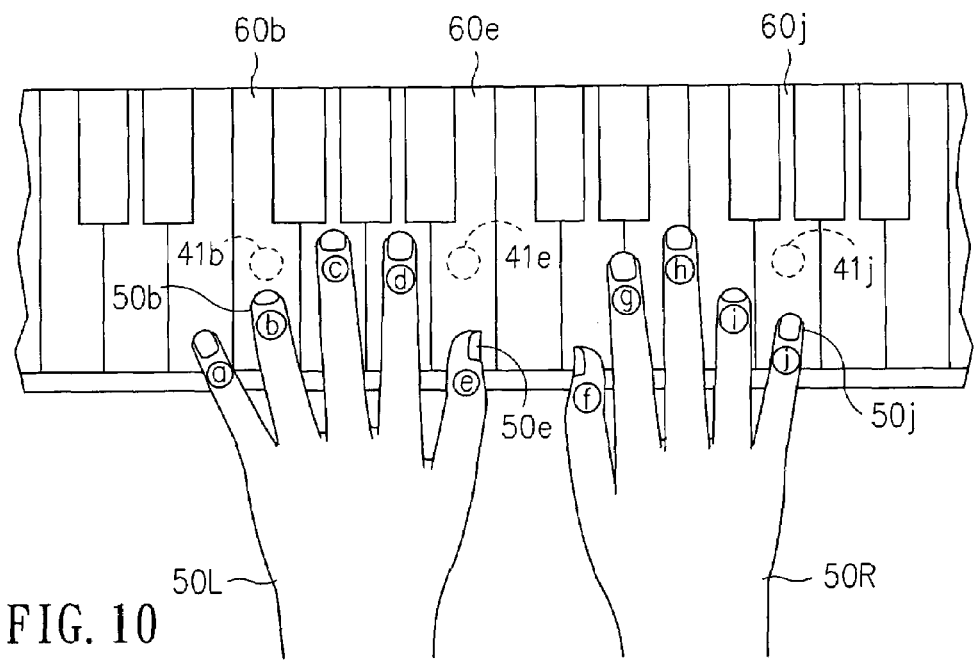
FIG. 10 shows a user playing a keyboard in a manner that it is conforming to the directions of the keyboard instrument learning apparatus of the invention.

Please refer to FIG. 10, which shows a user playing a keyboard in a manner that it is conforming to the directions of the keyboard instrument learning apparatus of the invention. In FIG. 10, the imaging unit 20, the data access/storage device 30, the processing unit 31 and the image signal output device 40 are similar to those shown in FIG. 3. However, the marking units a~j are round-shaped patches capable of being adhere onto the left-hand 50L fingers and right-hand 50R fingers in respective. As the usages and structures of the aforesaid devices are all similar to those described in FIG. 3, they are not described further herein. When a musical composition is selected and playing, color patterns 41b, 41e, 41j, corresponding to the musical notes of the music are to be projected by the image signal output device 40 onto their corresponding keys 60b, 60e, 60j, so that a student player can press his/her fingers 50b, 50e, 50j fitted with marking units b, e, j matching with the projected color patterns 41b, 41e, 41j onto the keys 60b, 60e, 60j. Thereafter, the imaging unit 20 is enable to capture an image of the marking unit b, e, j and the color patterns 41b, 41e, 41j, and the transmits the captured image to the processing unit 31 where they are compared to determine whether the color of the marking unit b can match with that of the color pattern 41b, the color of the marking unit e can match with that of the color pattern 41e, and the color of the marking unit j can match with that of the color pattern 41j. If all matches as shown in FIG. 10, the student player is allowed to continue playing the selected musical composition.

Figure 11:
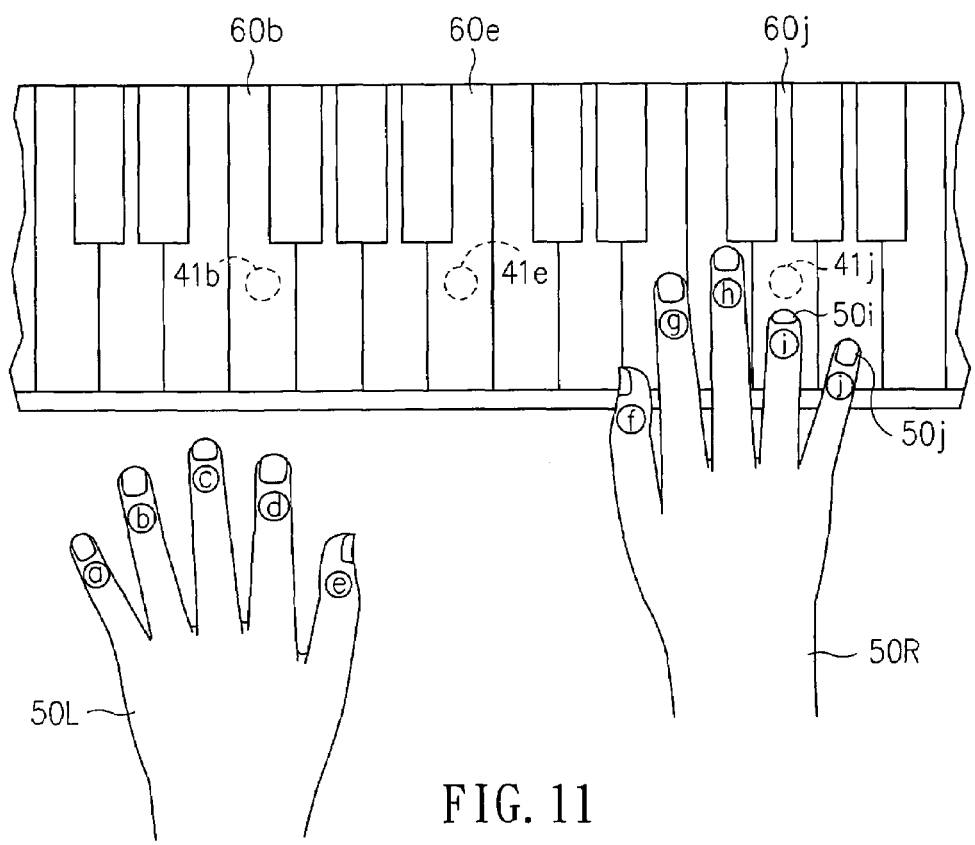
FIG. 11 shows a user playing a keyboard in a manner that it is not conforming to the directions of the keyboard instrument learning apparatus of the invention.

Please refer to FIG. 11, which shows a user playing a keyboard in a manner that it is not conforming to the directions of the keyboard instrument learning apparatus of the invention. When the color patterns 41b, 41e, 41j, corresponding to the musical notes of the music are projected by the image signal output device 40 onto their corresponding keys 60b, 60e, 60j and if the user's left hand 50L is not able to complete playing the keys specified above, the marking units b and e will not be captured in image of the imaging unit 20 for comparison and thus the keyboard instrument learning apparatus will issue an abnormal alarm for reminding the student player. On the other hand, if the student player play the right hand 50R portion with wrong fingers, i.e. pressing the key of color pattern 40j with the finger 50i fitted with the marking unit i, the processing unit 31 will find that the color of the marking unit i is not match with that of the color pattern 40j and thus an abnormal alarm will be issued for reminding the student player with the error.

To sum up, the apparatus for keyboard instrument learning is an interactive multimedia device capable of acting as a virtual musical keyboard to be used for fingering training in a self-educating and playful manner. Moreover, as the structuring of the aforesaid apparatus is simple complicated and easy to use, it can be used for enhancing the learning interest of children, elders and slow-learners. In addition, it not only can be adapted as a conventional piano, but also can provide virtual keyboard capability. I The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyboard instrument learning apparatus, comprising:
a data access/storage device, for storing musical compositions and fingerings;
an image signal output device, capable of accessing one musical composition and fingering selected from those musical compositions and fingerings stored in the data access/storage device and thus outputting an image signal accordingly;
a plurality of marking units, adapted to be fitted on fingers of a user;
an imaging unit, capable of capturing an image of fingers as the fingers are fitted with the marking units in respective and an image of a surface where the fingers are placed as well; and
a processing unit, for analyzing the images captured by the imaging unit.

2. The keyboard instrument learning apparatus of claim 1, wherein the processing unit is capable of analyzing images including: the images of the marking units fitted on the user's fingers being captured by the imaging unit, and images of the image signal outputted from the image signal output device.

3. The keyboard instrument learning apparatus of claim 1, wherein when the fingers fitted with the marking units are placed on an actual keyboard, the processing unit is enabled to recognize and identify fingering positions of the selected musical composition with relative to the actual keyboard.

4. The keyboard instrument learning apparatus of claim 1, wherein when the fingers fitted with the marking units are placed on a surface without actual keyboard, the processing unit is enabled to generate an image signal of virtual keyboard while marking fingering positions of the selected musical composition with relative to the image of the virtual keyboard.

5. The keyboard instrument learning apparatus of claim 1, wherein the imaging unit is a device selected from the group consisting of cameras, camcorders, and the like.

6. The keyboard instrument learning apparatus of claim 1, further comprising an audio signal output device.

7. The keyboard instrument learning apparatus of claim 6, wherein the audio signal output device is a device selected from the group consisting of a speaker, a loudspeaker, an earphone and the combination thereof.

8. The keyboard instrument learning apparatus of claim 1, wherein the image signal output device is a projector.

9. The keyboard instrument learning apparatus of claim 1, wherein the plural marking units are structured to be fitted on fingers while overall being designed with at least two distinctive appearances.

10. The keyboard instrument learning apparatus of claim 9, wherein the marking units are designed with different appearances, each composed of characteristics formed by at least a factor selected from the group consisting of colors, tones, geometrical patterns, geometrical lines and the combinations thereof.

11. The keyboard instrument learning apparatus of claim 10, wherein the colors and tones used for featuring each marking unit are achieved by a means selected from the group consisting of: coating the featuring colors and tones on the surfaces of the marking unit, attaching a patch of such colors and tones upon the marking unit, forming the marking unit with a material of such colors and tones, and integrally forming a part with such colors and tones with the marking unit.

12. The keyboard instrument learning apparatus of claim 9, wherein the marking units are configured with illuminators capable of emitting lights of different colors.

13. The keyboard instrument learning apparatus of claim 12, wherein each illuminator is a device selected from the group consisting of light emitting diode (LED), light bulb and the like.

14. The keyboard instrument learning apparatus of claim 1, further comprising:
a plurality of pressure sensors, being mounted on the user's fingers so that they are activated while pressed.

15. The keyboard instrument learning apparatus of claim 14, wherein the plural pressure sensors are arranged at pulp areas of the user's fingers in respective.

16. The keyboard instrument learning apparatus of claim 14, wherein the plural pressure sensors are electrically connected to a plurality of illuminators corresponding thereto in a manner that the illuminators are driven to emit light as soon as the corresponding pressure sensors are activated.

17. The keyboard instrument learning apparatus of claim 16, wherein the plural illuminators are arranged at dorsal areas of the user's fingers in respective.

18. The keyboard instrument learning apparatus of claim 16, wherein each illuminator is a device selected from the group consisting of light emitting diode (LED), light bulb and the like.

19. The keyboard instrument learning apparatus of claim 16, wherein the brightness of the illuminator being lighted is in direct proportion with the pressure exerted on the corresponding pressure sensor.

20. The keyboard instrument learning apparatus of claim 16, wherein the audio volume of the audio signal output device is in direct proportion with the pressure exerted on the corresponding pressure sensor.

21. A keyboard instrument learning method, comprising the steps of:
storing musical compositions and fingerings in a data access/storage device;
using an image signal output device to access one musical composition and fingering selected from those musical compositions and fingerings stored in the data access/storage device and thus outputting image signal accordingly; and
a fingering comparison process, comprising the steps of:
fitting marking units onto fingers of a user in respective;
using an imaging unit to capture an image of the fingers as the fingers are fitted with the marking units and an image of a surface where the fingers are placed; and
using a processing unit to analyze the images captured by the imaging unit.

22. The keyboard instrument learning method of claim 21, wherein the analysis of the processing unit is performed by comparing the images of the marking units fitted on the user's fingers being captured by the imaging unit with image of the image signal outputted from the image signal output device.

23. The keyboard instrument learning method of claim 21, further comprising the steps of:
determining whether an actual keyboard is existed in the images captured by the imaging unit;
enabling the processing unit to recognize and identify fingering positions of the selected musical composition with relative to the actual keyboard if the actual keyboard exists; and
enabling the image output device to generate a virtual keyboard while enabling the processing unit to mark fingering positions of the selected musical composition with relative to the virtual keyboard if no actual keyboard exists.

24. The keyboard instrument learning method of claim 21, wherein the imaging unit is a device selected from the group consisting of cameras, camcorders, and the like.

25. The keyboard instrument learning method of claim 22, wherein as the images being compared includes: the images of the marking units fitted on the user's fingers being captured by the imaging unit, and image of the image signal outputted from the image signal output device, the keyboard instrument learning method further comprises the steps of:
enabling the image signal output device to access another musical composition and fingering and thus output another image signal accordingly if no abnormal is detected in the fingering comparison process; and
issuing an alarming signal if abnormalities are detected in the fingering comparison process.

26. The keyboard instrument learning method of claim 25, wherein the alarming signal is a signal selected from the group consisting of audio signals including muting, voice alert, etc., and video signals including warning images, flashing lights, etc.

27. The keyboard instrument learning method of claim 21, wherein the image signal output device further comprises an audio signal output device.

28. The keyboard instrument learning method of claim 21, wherein the plural marking units are structured to be fitted on fingers while overall being designed with at least two distinctive appearances.

29. The keyboard instrument learning method of claim 28, wherein the marking units are finger-cots capable of being mounted on the user's fingers.

30. The keyboard instrument learning method of claim 28, wherein the marking units are adhesive parts capable of being adhered upon the user's fingers.

31. The keyboard instrument learning method of claim 28, wherein the marking units are designed with different appearances, each composed of characteristics formed by at least a factor selected from the group consisting of colors, tones, geometrical patterns, geometrical lines and the combinations thereof.

32. The keyboard instrument learning method of claim 31, wherein the colors and tones used for featuring each marking unit are achieved by a means selected from the group consisting of: coating the featuring colors and tones on the surfaces of the marking unit, attaching a patch of such colors and tones upon the marking unit, forming the marking unit with a material of such colors and tones, and integrally forming a part with such colors and tones with the marking unit.

33. The keyboard instrument learning method of claim 28, wherein the marking units are configured with illuminators capable of emitting lights of different colors.

34. The keyboard instrument learning method of claim 21, wherein the plural marking unit are configured with a plurality of pressure sensors in respective, being mounted on the user's fingers at positions where are used for pressing so that they are activated while pressed.

35. The keyboard instrument learning method of claim 34, wherein the plural pressure sensors are electrically connected to a plurality of illuminators corresponding thereto in a manner that the illuminators are driven to emit light as soon as the corresponding pressure sensors are activated.

36. The keyboard instrument learning method of claim 35, wherein the brightness of the illuminator being lighted is in direct proportion with the pressure exerted on the corresponding pressure sensor.

37. The keyboard instrument learning method of claim 36, wherein the marking unit is further configured with an audio signal output device in a manner that the audio volume of the audio signal output device is in direct proportion with the pressure exerted on the corresponding pressure sensor.

* * * * *